Figure 1:
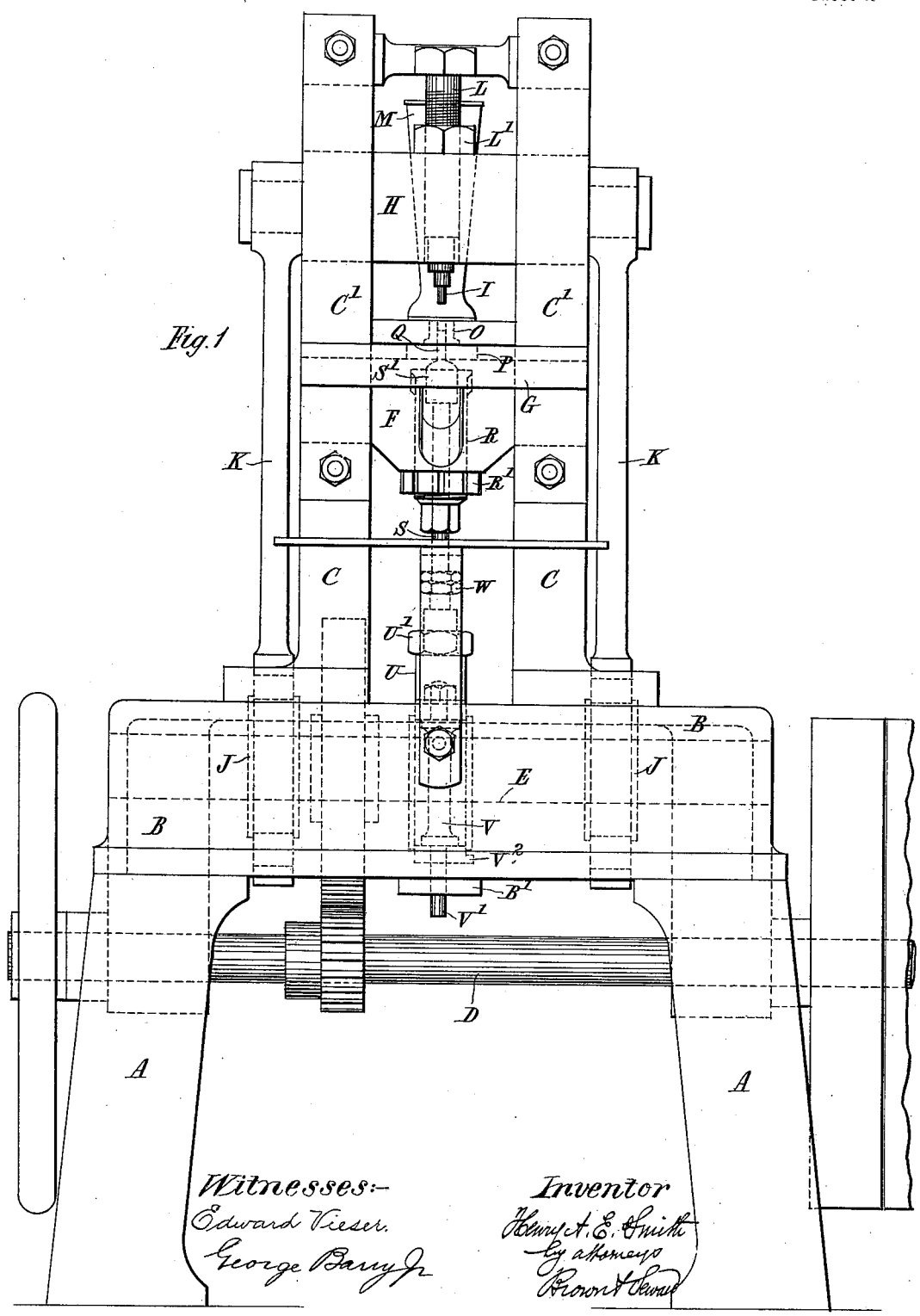

No. 614,239. Patented Nov. 15, 1898.
H. A. E. SMITH.
MOLDING PRESS.
(Application filed Jan. 18, 1898.)
(No Model.) 2 Sheets—Sheet 1.

Witnesses:— Inventor
Edward Vieser. Henry A. E. Smith
George Barry Jr by attorneys

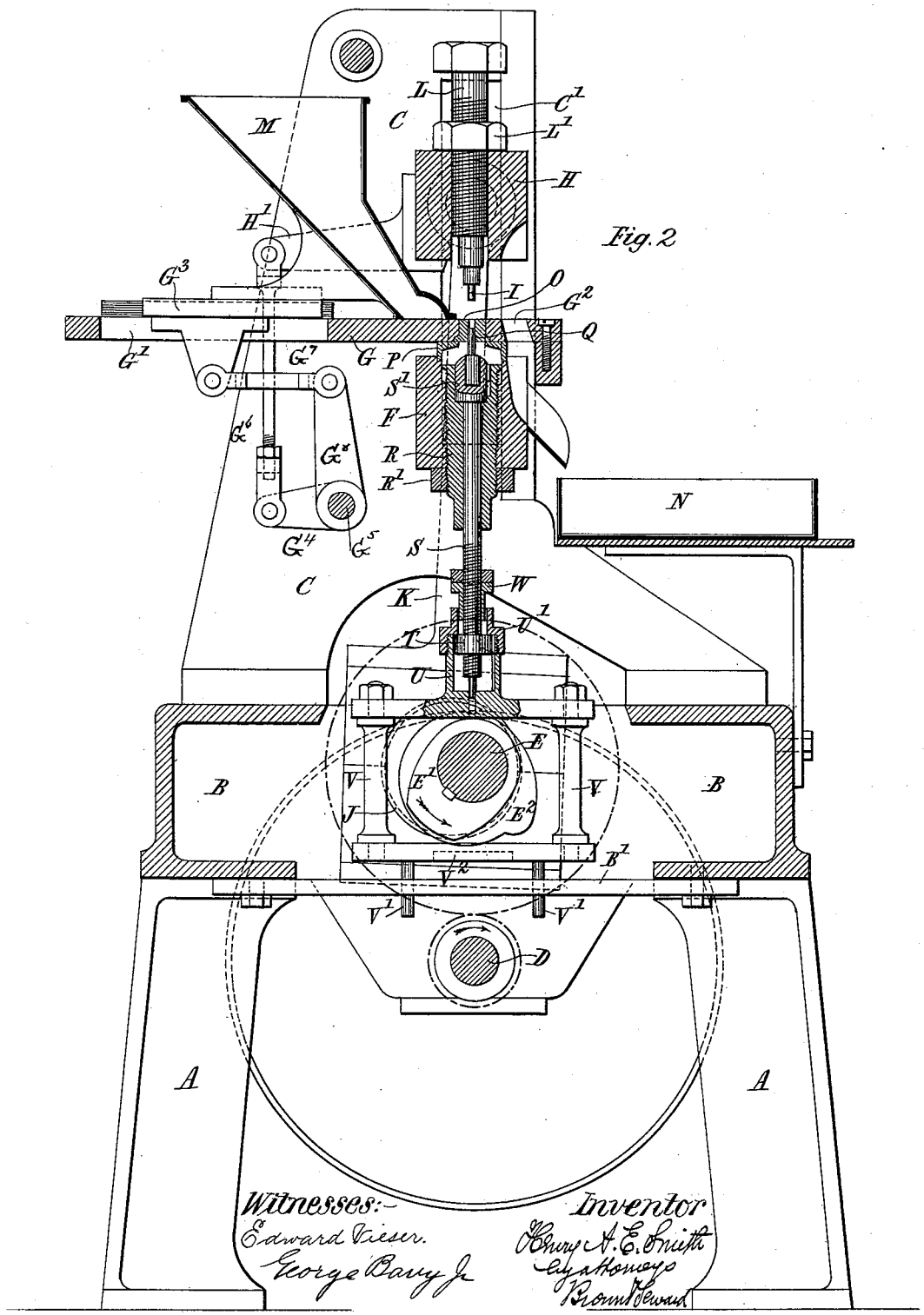

UNITED STATES PATENT OFFICE.

HENRY A. E. SMITH, OF WALTHAMSTOW, ENGLAND, ASSIGNOR TO WILLIAM RALPH DODD, OF LONDON, ENGLAND.

MOLDING-PRESS.

SPECIFICATION forming part of Letters Patent No. 614,239, dated November 15, 1898.

Application filed January 18, 1898. Serial No. 667,021. (No model.)

*To all whom it may concern:*

Be it known that I, HENRY ALFRED EDWARD SMITH, engineer, of 43 Hatherley road, Hoe street, Walthamstow, in the county of Essex, England, have invented certain new and useful Improvements in Molding-Presses, of which the following is a specification.

The chief object of this invention is to provide a simple and efficient press for molding or compressing drugs in a state of powder into pellets, tablets, lozenges, or other like form; but the invention is applicable for molding articles of commerce generally.

In the accompanying drawings, Figure 1 is a front elevation, and Fig. 2 a side elevation, partly in section, of the improved press.

A are standards supporting a casting or frame B, from which extend upwardly side pieces or guides C. The frame B carries bearings for the main driving-shaft D and also for a cam-shaft E, and the side pieces C are connected together by the cross-bar F and also carry a table G.

The side pieces C are provided with guides C' for a cross-head H, which carries the striking or compressing plunger I. This cross-head is operated in any convenient manner—as, for example, by means of eccentrics J, the straps of which are connected by rods K with the cross-head H.

The cam-shaft E is driven by spur-gearing, as shown, or in any other convenient manner.

A vertical threaded hole is formed in the cross-head H to receive a screw L, which carries the plunger I in any convenient manner, and this screw is locked in position by the lock-nut L'. The plunger can thus be raised and lowered as required to give less or more pressure.

The table G is faced and has a slot G', a die-hole, and a discharge-opening G². Mounted on the table is a slide G³, which carries a hopper M. The delivery end of the hopper is bound or otherwise provided with leather or other suitable material (not shown) and slides upon the table, the surface of which is faced or polished, motion being communicated from the cross-head to the hopper through a rock-shaft G⁵, working in bearings in the side pieces C, and rods G⁶ G⁷, an arm G⁴ of said rock-shaft being connected by the rod G⁶ with an arm H' on the cross-head H and an arm G⁸ of said rock-shaft being connected by the rod G⁷ with the hopper-slide G³. Thus as the cross-head rises after the plunger has struck the compressing blow the hopper is moved forward and pushes the pellet (which is presented to it as hereinafter described) over the opening G², through which the pellet falls into a receiver N, being guided thereto by a suitably-shaped chute.

O is a die which is inserted in the die-hole in the table G and is supported on a table P, carried by the cross-bar F. The hopper M reciprocates over this die, which is flush with the top of the table G, and at each forward movement the die is filled with powder, the backward movement of the hopper serving to remove the superfluous powder, so that the exact amount required is left in the die.

The bottom of the die is formed by a plunger, which may be called the "die-plunger" Q, and the height of this plunger is adjusted according to requirements. The office of this plunger Q is not only to form the bottom of the die and also the anvil to receive the blow of the compressing-plunger I, but it has also to rise to push the pellet out of the die and into the path of the advancing hopper, which pushes it over the opening G², as before explained.

The die-plunger Q is carried and operated as will be now described. In the fixed cross-bar F is formed a vertical threaded hole to receive an externally-threaded sleeve R, which can be locked in any position by the lock-nut R'. Through the sleeve passes a rod S, having an enlarged head S', which serves as the plunger-holder. This head fits into a recess formed in the end of the sleeve R to receive it and is prevented from turning, irrespective of the sleeve, by means of a feather or in any other convenient manner. The rod S is threaded at its lower end and passes through a nut T, which is contained in a cylindrical casing U, forming part of a rectangular frame V. The nut is free to rise and descend in this case, but is prevented from turning by a feather or otherwise. The casing U is closed by a perforated cover U', which has a shoulder that overlies the nut T and against which the nut normally bears. The end of the rod is turned down to form a steadying-pin which works in a hole in the bottom of the casing. Upon the rod S, above the cover U', is what may be termed a "lifting-nut" W, which consists of a flanged sleeve and a lock-nut. The sleeve portion enters the cover U'.

The frame V consists of top and bottom plates or bars connected together by bolts and nuts, and it may have at bottom two guides V', which enter guide-holes in a plate B', secured to the casting B. This frame spans the cam-shaft and is operated by tappet-cams E' E$^2$, keyed thereon. The tappet-cam E' acts to lift the frame by striking against the top bar and the tappet-cam E$^2$ to lower the frame, for which purpose it is arranged so as to strike on a lateral projection V$^2$ on the bottom bar.

The operation of the machine is as follows: The plungers being properly adjusted the machine is started. The cross-head H is raised by the eccentrics J, and the hopper M is advanced over the die O, by which means the die is filled with powder and the hopper then retires, cleaning, by means of the leather or other material, the top of the die. The plunger I now descends, compressing the powder in the die, the shoulder of the die-holder S' resting on the bottom of its recess, thus supporting the plunger Q while the blow is being struck. The plunger I now retires, the plunger Q following it, so as to bring the pellet clear of the die. The hopper again advances, pushing the pellet over the opening G$^2$, and the plunger Q retires to leave the die free to receive the powder, when the operation proceeds as before.

The movement of the plunger Q takes place as follows: The cam E' in its rotation strikes the top plate of the frame V and raises it and with it the casing U, with its cover U'. During its movement the cover strikes against the lifting-nut W and raises the rod S and with it the plunger Q, so as to push the pellet out of the die.

The cam E' is formed so as to cause the plunger to dwell in its raised position while the pellet is knocked away by the hopper M, when the cam E$^2$ comes into operation and by striking on the projection V$^2$ of the frame draws down the frame V, and with it the plunger Q, through the shoulder in the cover coming into contact with the nut T. The chamber in the die to be filled with powder as the hopper $m$ passes over it is thus provided for.

The amount of compression to be given to the powder will be regulated by screwing the die-carrier L up or down in the cross-head H.

The size of the pellet is provided for by raising or lowering the die-plunger Q, so as to leave a smaller or larger chamber in the die. As, however, the plunger Q must always rise to the same height in order to push the pellet out clear of the die and the size of the frame V and its cams is constant the adjustment must be provided for elsewhere, and the means shown in connection with the rod S have been adopted to effect this object. Suppose it is desired to lower the plunger. The sleeve R is screwed down, and by reason of the feather on the head the rod S is also rotated in the nut T. The nut T is thus, in effect, raised on the rod and remains normally in contact with the shoulder of the cover. The downward travel of the plunger is thus provided for; but the lifting-nut W also turns with the rod, and as the rod is lowered so also is the lifting-nut. Thus the cover U' comes into contact with the nut at an earlier moment and causes the plunger to travel the greater distance, though always to the same height.

I claim—

1. In a molding-press, the combination of a die, a compressing-plunger, a vertically-reciprocating cross-head carrying said plunger, a traveling hopper adapted to move across the die, means for operating said cross-head, and connections between the cross-head and the hopper for transmitting motion from the cross-head to the hopper, substantially as herein described.

2. In a molding-press, the combination of a die and a traveling hopper, with a die-plunger having an abutment in the cross-bar of the frame, a rod carrying the plunger, a rectangular frame connected with said rod, and tappet-cams adapted to raise and lower the frame, as and for the purpose set forth.

3. An adjustable connection between the cam-frame and the die-plunger rod, consisting of the frame and a casing attached thereto, the rod, a nut contained in the casing provided with a feather, and mounted on the screwed end of the rod, a cover to the casing, with shoulder overlying the nut, and a lifting-nut, as shown and described.

4. Means for adjusting the height of the die-plunger, consisting of the die-holder, the cross-bar and an externally-threaded sleeve working therein, and containing a recess for the die-holder, in combination with a lifting-rod, a lifting-frame, and tappet-cams for raising and lowering the frame, as shown and described.

5. In means for adjusting the height of the die-plunger, the combination with a cross-bar of the frame, of an externally-threaded sleeve having a recess in its upper end, a lock-nut, and a plunger-holder adapted to rise and fall in the recess, but not to turn therein, as shown and described.

6. In a molding-press, the combination with a table recessed to receive a die, of a die, a die-support below the table, and perforated to permit of the passage of a plunger, and a cross-bar of the frame carrying the support, as shown and described.

London, England, January 3, 1898.

HENRY A. E. SMITH.

Witnesses:
H. K. WHITE,
H. F. C. GOLTZ.